United States Patent [19]
Chase et al.

[11] Patent Number: 5,845,512
[45] Date of Patent: Dec. 8, 1998

[54] LOW TEMPERATURE COMPOSITION PREPARATION DEVICE, AND METHODS OF CONSTRUCTING AND UTILIZING SAME

[76] Inventors: Thomas W. Chase, P.O. Box 943, Alton, N.H. 03809; Richard C. Pahl, 436 Date Palm Ct. NE., St. Petersburg, Fla. 33703; Greg Walsh, 24 Tamarack Dr., Essex Junction, Vt. 05452

[21] Appl. No.: 930,323
[22] PCT Filed: Mar. 27, 1996
[86] PCT No.: PCT/US96/04248
  § 371 Date: Feb. 23, 1998
  § 102(e) Date: Feb. 23, 1998
[87] PCT Pub. No.: WO96/29884
  PCT Pub. Date: Oct. 3, 1996

Related U.S. Application Data

[63] Continuation-in-part of Ser. No. 410,967, Mar. 27, 1995, Pat. No. 5,617,734.

[51] Int. Cl.⁶ .................................................. A23G 9/12
[52] U.S. Cl. ................................ 62/343; 62/525; 366/288
[58] Field of Search .............................. 62/342, 343, 525, 62/527; 165/94, 139, 154; 366/288, 318

[56] References Cited

U.S. PATENT DOCUMENTS

| | | | |
|---|---|---|---|
| 2,148,414 | 2/1939 | Wolfert et al. | 62/525 |
| 2,718,123 | 9/1955 | Braswell, Jr. | 62/525 |
| 3,761,060 | 9/1973 | Schwab et al. | 259/22 |
| 3,900,188 | 8/1975 | Seufert | 259/192 |
| 4,052,180 | 10/1977 | Erickson | 62/342 |
| 4,277,953 | 7/1981 | Kramer | 62/525 |
| 5,341,656 | 8/1994 | Rust, Jr. et al. | 62/525 |

*Primary Examiner*—William E. Tapolcai
*Attorney, Agent, or Firm*—Carrier, Blackman & Associates, P.C.; Joseph P. Carrier; William D. Blackman

[57] ABSTRACT

A device for mixing or otherwise processing compositions at preselected temperatures, comprising a container for receiving the composition ingredients; a jacket member disposed about the container at a spaced distance therefrom so as to form a substantially sealed area therebetween; a unit for introducing fluid flow through the area defined by the relationship between the jacket member and the container; and wherein the jacket member includes a plurality of inlet ports disposed substantially evenly about an end portion of the jacket member for receiving the fluid which is introduced into the defined area, so as to maintain the container at a substantially uniform temperature.

14 Claims, 13 Drawing Sheets

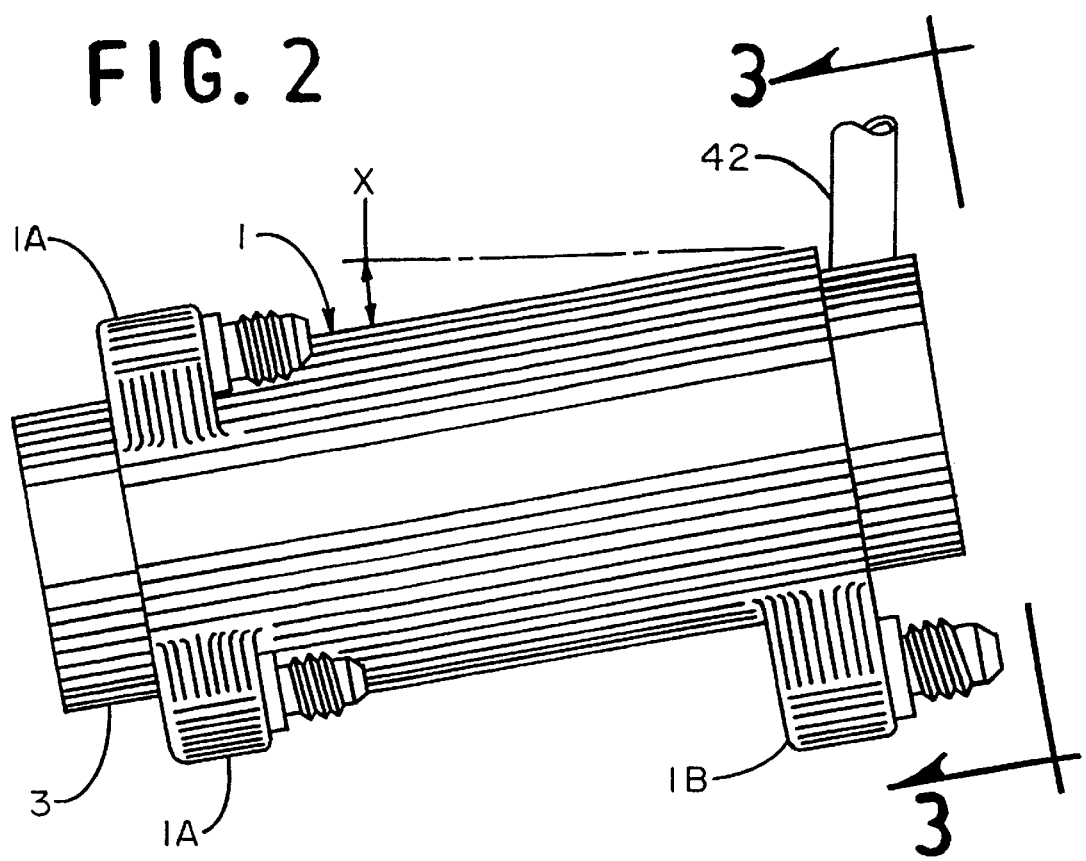
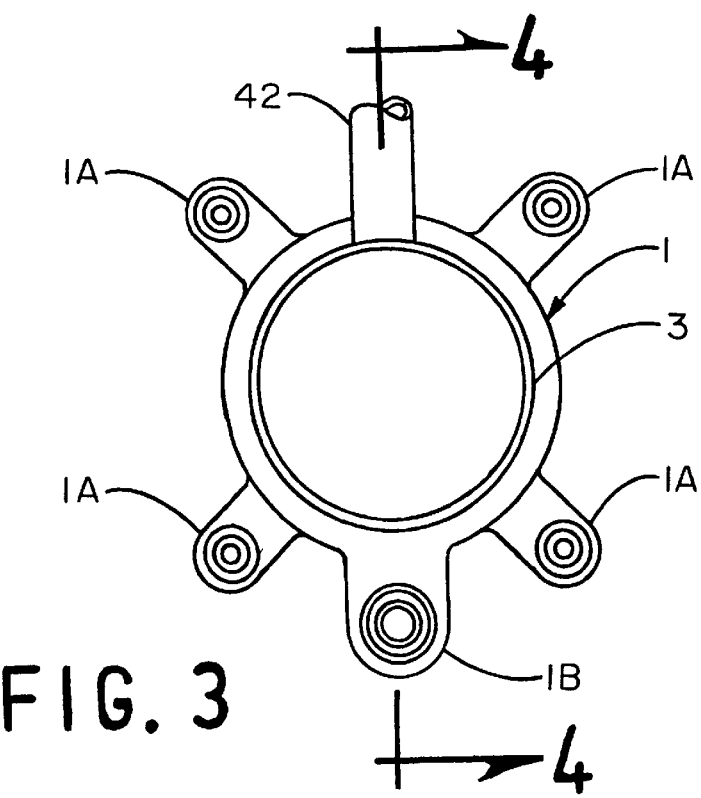

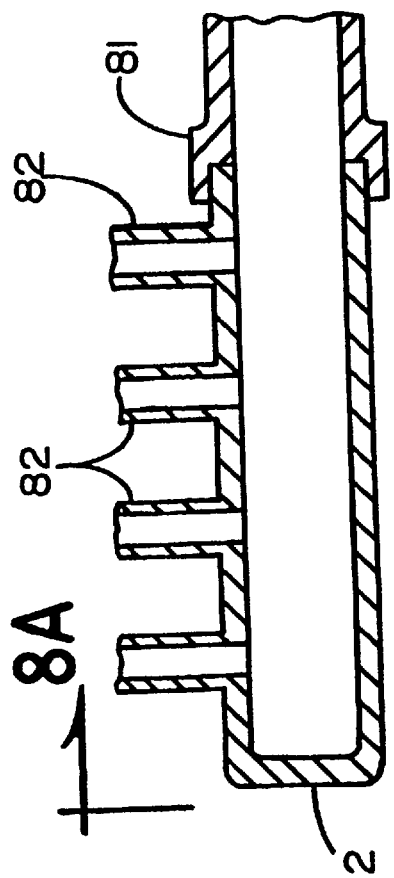
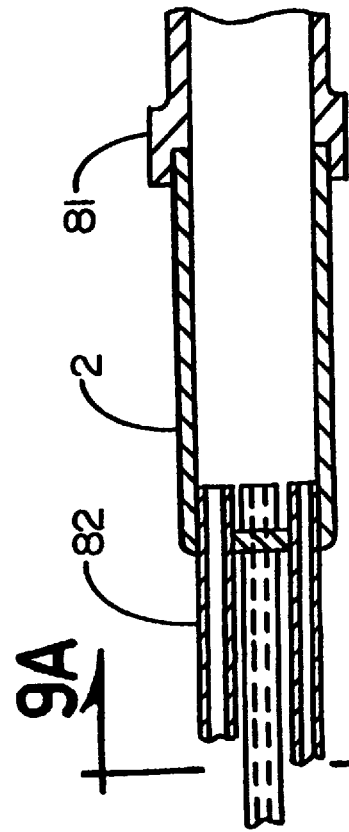
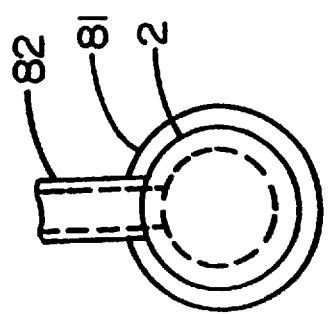
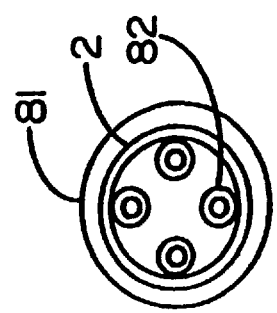
FIG. 8
FIG. 9
FIG. 8A
FIG. 9A

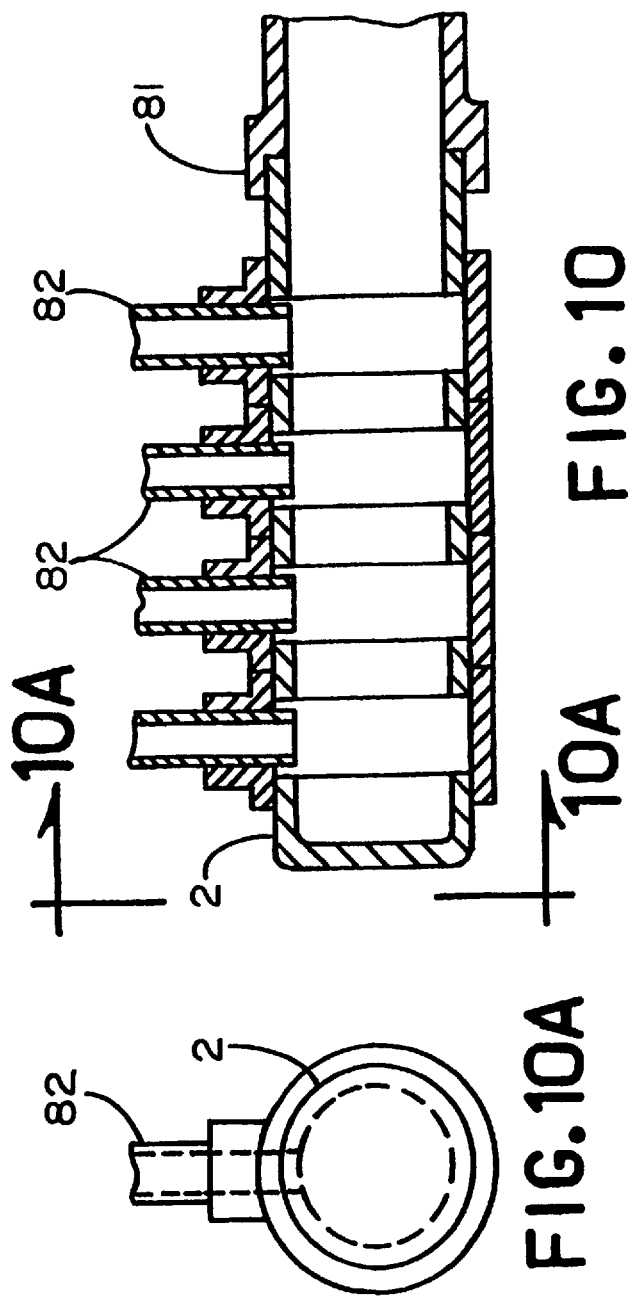

LOW TEMPERATURE COMPOSITION PREPARATION DEVICE, AND METHODS OF CONSTRUCTING AND UTILIZING SAME

This application is a 371 of PCT/US96/04248 filed Mar. 27, 1996 abandoned, the application is a Continuation-In-Part (CIP) of prior application U.S. Ser. No. 08/410,967, filed Mar. 27, 1995, now U.S. Pat. No. 5,617,734.

BACKGROUND OF THE INVENTION

This invention relates to a device for preparing a composition at preselected temperatures, and specifically to a semi-frozen food preparation apparatus for preparing and dispensing soft-serve ice cream or similar foods.

There are known soft-serve ice cream machines. For example, Erickson U.S. Pat. No. 4,052,180 discloses a soft ice cream machine including a reservoir and mixing arm for mixing the ice cream. Erickson, however, fails to disclose a device for preparing food compositions including a jacket member and manifold which maintain the reservoir at a uniform temperature, and a mechanism for thoroughly aerating the device in the reservoir.

The present invention overcomes the above discussed limitations and shortcomings of known composition processing devices, and satisfies a significant need for such a device which thoroughly mixes, aerates, and effectively discharges a confection at a cooled, preselected temperature, and which thoroughly cleans the device when not in use.

The present invention is a composition preparation and dispensing device, comprising a container for receiving the composition ingredients, having a input port and an output port located at opposite ends thereof; a jacket member which is disposed about the container so that a substantially sealed area is formed therebetween; a unit for providing a refrigerant fluid to flow through the area defined between the container and jacket member; a manifold for substantially evenly distributing the coolant throughout the sealed area between the container and jacket member; an auger member for scraping the composition from the inner surface of the container at substantially all points thereon, mixing and aerating the composition throughout the container, and urging the composition towards a dispensing unit; and wherein the container is disposed within the device at an angle relative to a horizontal axis so as to effectively push the composition forwardly towards the dispensing unit so that the mixed product is effectively combined with newly added composition ingredients.

In use, as the composition ingredients are added to the container unit via the input port thereof, the cooling unit and the fluid flow providing unit introduce a flow of refrigerant in direct contact with the outer surface of the container substantially evenly so as to maintain the temperature of the container surface at a substantially uniform temperature. The ingredients are thoroughly mixed with air to achieve the desired product consistency, and aerated by imparting planetary motion to the auger member, which urges the mixture towards the container wall for cooling, scrapes it therefrom, and urges the mixture towards the output port for dispensing.

Upon dispensing the mixed product, the device is cleaned by adding a substantially liquid cleaning product to the container via the input port, operating the auger member so as to thoroughly splash the cleaner against substantially all portions of the container, and draining the cleaner therefrom using the output port.

An object of the invention is to provide a device which effectively prepares a composition.

Other objects, advantages and salient features of the present invention will become apparent from the following detailed description, which, when taken in conjunction with the annexed drawings, discloses preferred embodiments of the present invention.

FIG. 2 is a side elevational view of a jacket member-container member of the present invention.

FIG. 3 is an internal cross sectional view taken along the 3—3 line of FIG. 2.

FIG. 8 is a cross sectional view of a manifold member.

FIG. 8a is a cross sectional view of the manifold of FIG. 8 taken along the 8a—8a line therein.

FIG. 9 is a cross sectional view of a second manifold member.

FIG. 9a is a cross sectional view of the manifold of FIG. 9 taken along the 9a—9a line therein.

FIG. 10 is a cross sectional view of another manifold member.

FIG. 10a is a cross sectional view of the manifold of FIG. 10 taken along the 10a—10a line therein.

DETAILED DESCRIPTION OF THE INVENTION

Figure 1:
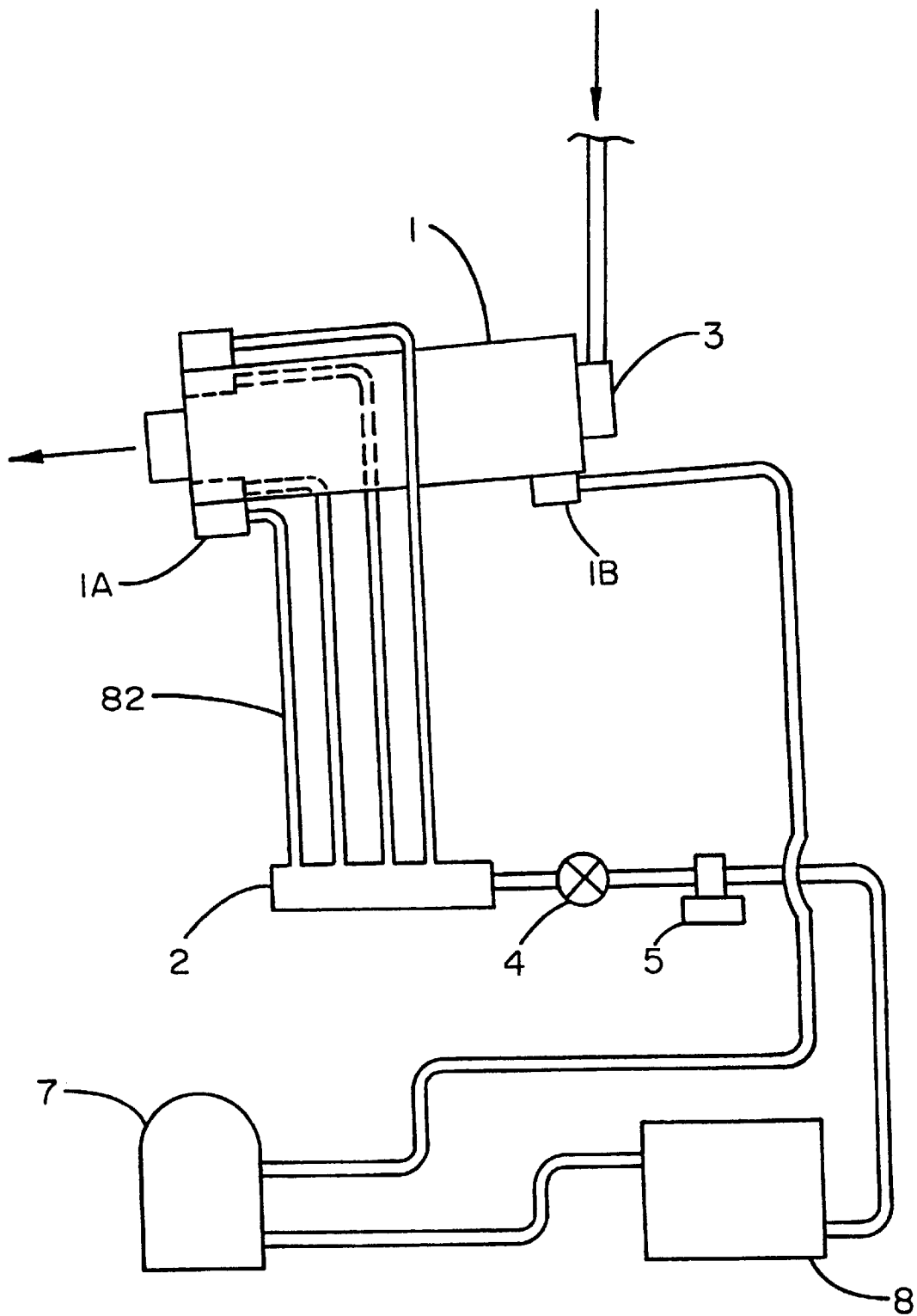
FIG. 1 is a block diagram illustrating a preferred embodiment of the present invention.

Referring to FIGS. 1–17, there is shown a device for preparing and dispensing a composition at a desired temperature, comprising jacket member 1; product tube container 3, which is positioned within jacket member 1 and connected thereto so as to form a substantially sealed area therebetween; manifold 2, one end of which is connected to jacket member 1 at a plurality of locations therealong; condenser 8, which is connected to a second end of manifold 2 via valve 5 and pressure control device 4; compressor 7, which is connected to condenser 8 so as to provide a fluid, such as a refrigerant, under pressure to jacket member 1; and auger member 40. Condenser 8 and compressor 7 cooperate with jacket member 1 so as to introduce fluid flow through the area between product tube 3 and jacket member 1 so as to maintain product tube 3 at a substantially uniform, preselected temperature by directly contacting the outer surface thereof with refrigerant.

The device may be used in a wide variety of applications in which powdered, liquid and/or semi-liquid compositions are aerated and/or prepared at any of a wide range of temperatures. The invention may be used in a wide number of applications, including but not necessarily limited to soft serve ice cream machines, chemical mixing machines, milk shake or other beverage machines, and cheese processing machines.

Product tube container 3 retains the composition to be mixed and aerated. Product tube 3 is substantially cylindrical and includes an input port disposed at a first end thereof for receiving composition ingredients into product tube 3 to be worked, and an output port disposed at an end opposite the first end for dispensing the mixed or worked composition from product tube 3. The cylindrical surface of product tube 3 is thermally conductive and substantially smooth so that articles received therein can be worked or processed at any of a variety of selected temperatures.

As shown in FIGS. 1 and 4–6, the input port of product tube 3 is connected to product supply input tube 42 so as to provide direct access to the inside of product tube 3. As shown in FIGS. 2–6, the present invention includes jacket member 1, which is preferably substantially disposed around product tube 3 so as to form sealed area A therebetween. In a preferred embodiment, jacket member 1 is integrally formed with product tube 3 so as to form a unitary member. Alternatively, jacket member 1 is substantially sealed to product tube 3 by the use of grooves located therein for positioning gaskets, O-rings 70 or other sealing devices therebetween.

Jacket member 1 is preferably thermally insulating to as to efficiently maintain product tube 3 at the desired temperature.

Figure 4:
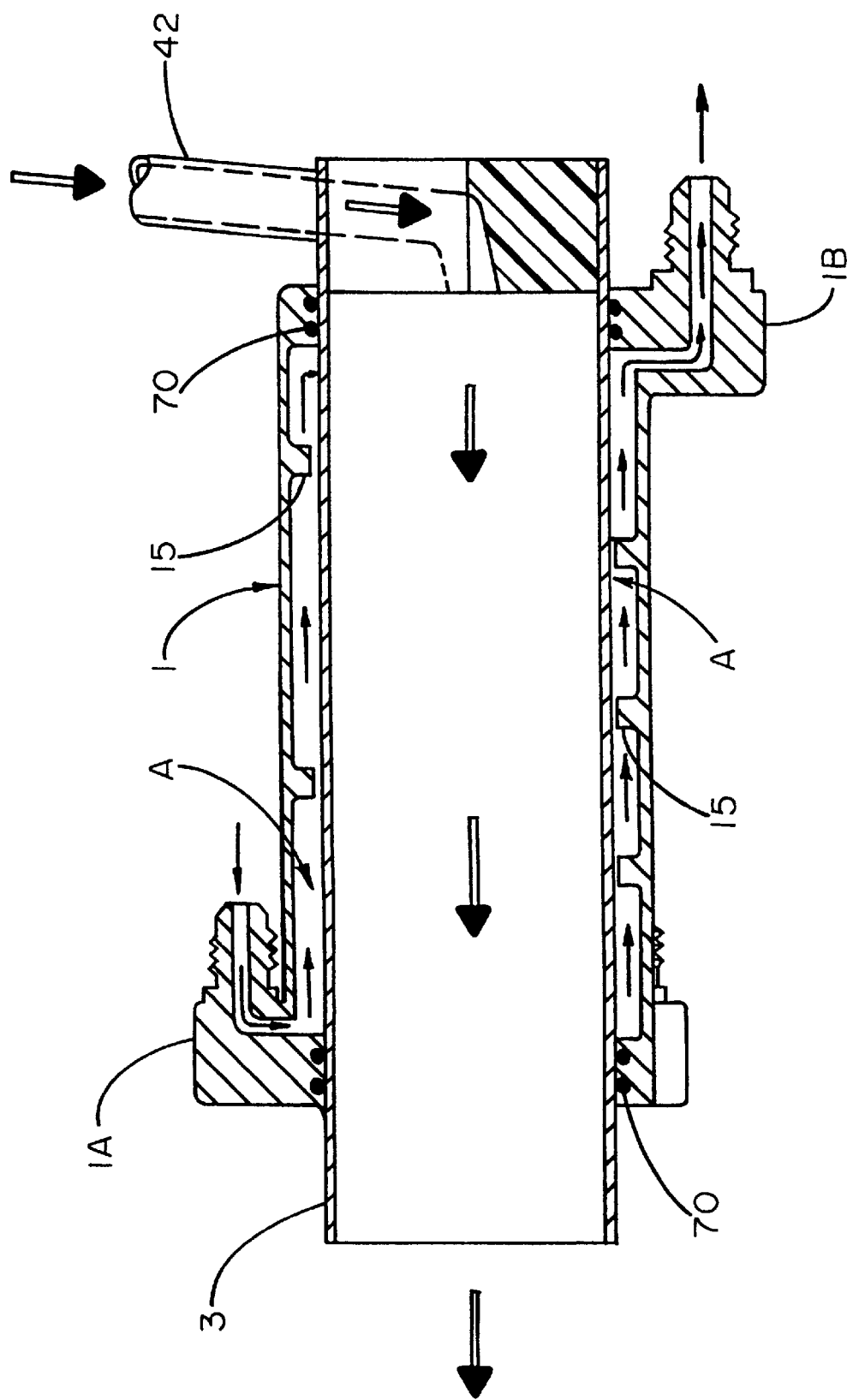
FIG. 4 is a cross sectional view of the present invention taken along the 4—4 line of FIG. 3.
Figure 18:
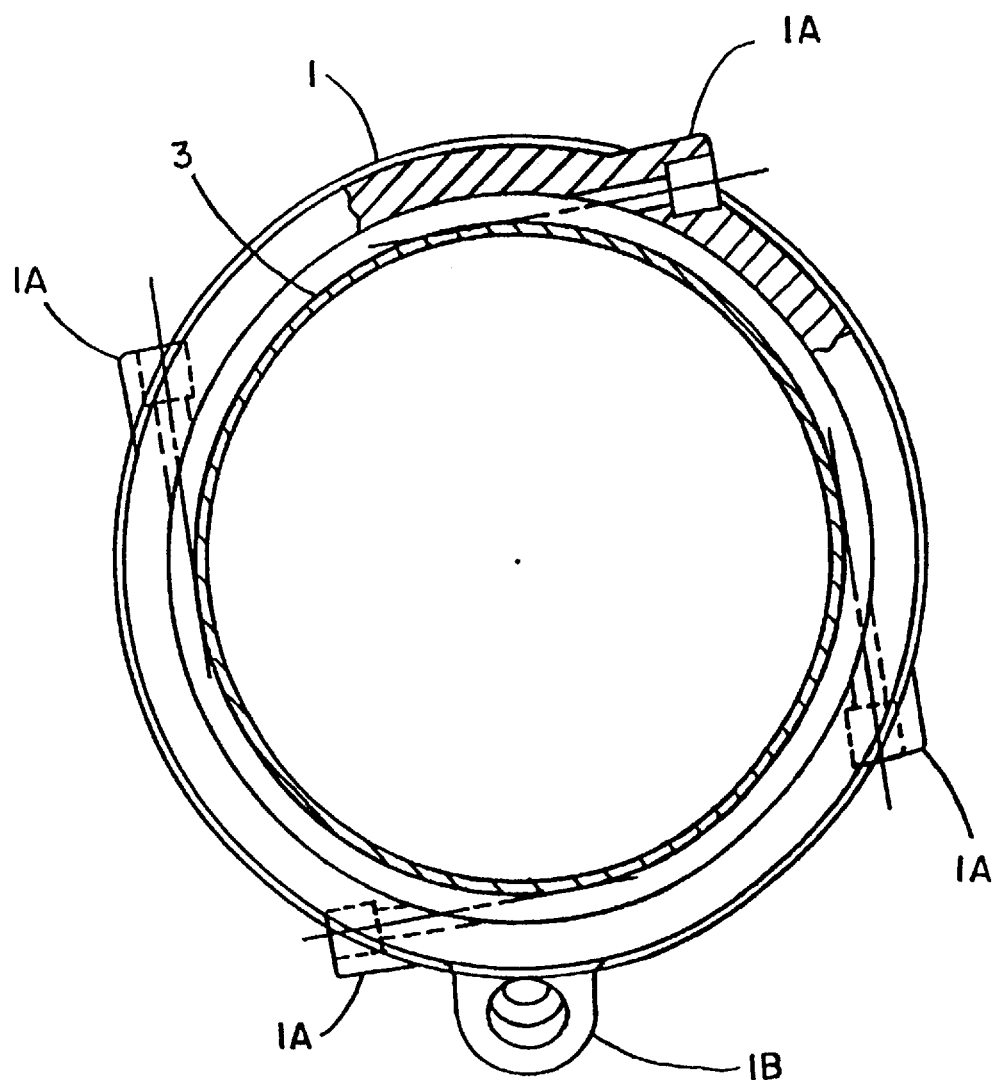
FIG. 18 is an end view of the present invention.

Jacket member 1 preferably includes a plurality of inlet ports 1A for directing fluid flow, such as refrigerant fluid, from condenser 8 and compressor 7 substantially evenly through area A, as shown in FIGS. 3 and 4. Inlet ports 1A are preferably substantially evenly disposed about one end of jacket member 1 along the outer surface thereof, as shown in FIGS. 3 and 18. The purpose of having a plurality of inlet ports 1A evenly disposed about one end of jacket member 1 is to introduce fluid flow, such as a refrigerant, through area A under pressure so as to directly contact and thereby maintain product tube 3 at a substantially uniform temperature. The substantially uniform temperature characteristic of the present invention is a significant improvement over the use of coils or other similar temperature transfer techniques (i.e., heat sinking techniques) wherein noticeable temperature variations and low efficiency (50%) exist along a product tube between surface portions which contact or are adjacent the coils and surface portions which are not.

The exact number of inlet ports 1A may vary depending upon, among other things, the diameter and length of product tube 3 and/or jacket member 1, the diameter of each inlet port 1A, the characteristics of condenser 8 and compressor 7, the extent of desired temperature uniformity across the surface of product tube 3, the thermal characteristics of product tube 3 and jacket member 1, and the desired temperature range in which compositions are to be worked. Jacket member 1 includes at least one outlet port 1B.

Each inlet port 1A preferably extends outwardly from jacket member 1 at an angle so that refrigerant enters jacket member 1 substantially tangentially to product tube 3, as shown in FIG. 18. This tangential relationship between the incoming refrigerant and product tube 3 allows the refrigerant to swirl around product tube 3, thereby providing substantially even flow around product tube 3. In addition, the swirling flow of refrigerant creates turbulence within product tube 3 which leads to the refrigerant, initially liquified within condenser 8 and manifold 2, more rapidly transforming into a gaseous state upon entering the lower pressure area A between jacket member 1 and product tube 3. When in the gaseous state, the refrigerant more efficiently cools product tube 3.

Figure 19:
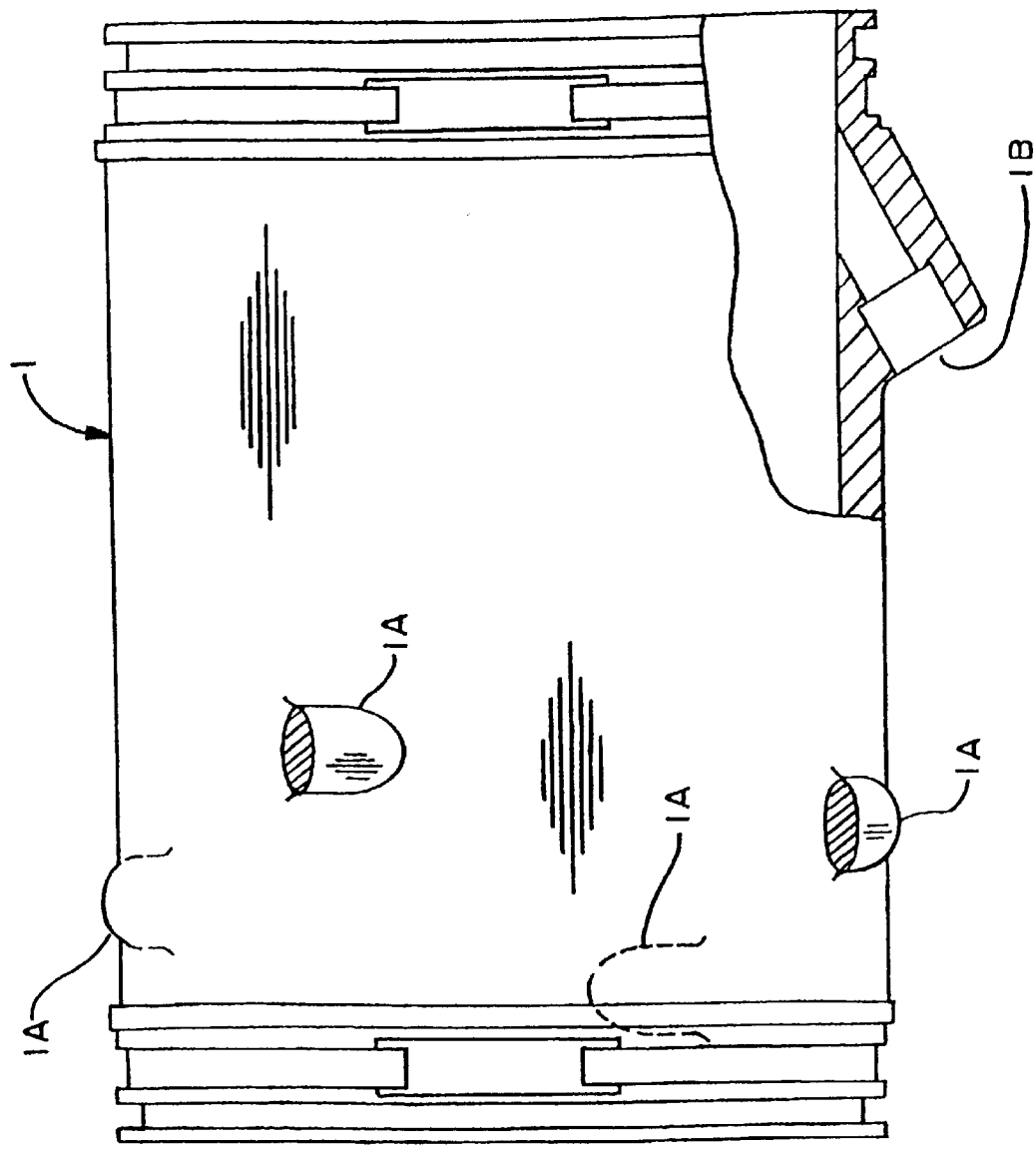
FIG. 19 is a cross-sectional view of the present invention.

Further, inlet ports 1A are preferably longitudinally staggered along jacket member 1, as shown in FIG. 19. The staggered relationship between inlet ports 1A avoids overlapping path flow, thus providing more surface area of product tube 3 which is directly contacted by the flowing refrigerant.

Outlet port 1B is preferably disposed at an end portion of jacket member 1 which is opposite the end portions to which inlet ports are disposed. Outlet port 1B is preferably disposed along a bottom portion of jacket member 1 (FIG. 19) so that any liquid remaining within area A may be effectively drained therefrom.

As shown in FIG. 4, in a preferred embodiment jacket member 1 includes ducting 15 disposed along an inner surface of jacket member 1. Ducting 15 provides direction or control of refrigerant flowing through area A from inlet ports 1A to outlet port 1B by creating flow turbulence, enhancing flow density, and limiting flow in desired areas within area A. Ducting 15 preferably includes both protrusions extending inwardly from an inner surface of jacket member 1 and grooving disposed therealong.

The connection to inlet ports 1A may preferably include fittings for a flared, compression, interlocked, or direct connection. Alternatively, inlet ports 1A and outlet port 1B are molded, integrally forged or machine cast with jacket member 1 so as to form a unitary member.

The present invention additionally includes means, connected between condenser 8 and jacket member 1, for substantially evenly distributing fluid, such as a refrigerant, to jacket member 1 so as to maintain product tube 3 at a desired, uniform temperature. As shown in FIG. 1, such fluid providing means comprises manifold 2. Manifold 2 substantially evenly distributes fluids flowing from condenser 8 to each inlet port 1A of jacket member 1. Referring to FIGS. 8–10, manifold 2 comprises high pressure fluid supply port 81, which is connected to the output of condenser 8 for receiving fluids under pressure; and a plurality of distribution tubes 82, each of which connects to a separate inlet port 1A so as to provide fluid communication between condenser 8 and jacket member 1. Manifold 2 is preferably formed as a unitary member by solid cast brazing or otherwise attaching distribution tubes 82 thereto, and requires little servicing because there are no moving parts. As a result, the only substantial testing necessary is in performing a pressure test on manifold 2 prior to installation so as to detect any leakages therein. Manifold 2 is preferably thermally insulating and disposed substantially proximally to jacket member 1.

Distribution tubes 82 may be disposed along a side portion of manifold 2 (FIGS. 8 and 8A); disposed about an end portion of manifold 2 (FIGS. 9 and 9A); disposed by attaching a plurality of fittings together by direct, flared, compression or interlocking connections (FIGS. 10 and 10A).

Actual sizes of distribution tubes 82 and fluid supply port 81 vary depending upon the application of the present invention. In relative terms, the combined cross-sectional areas of all distribution tubes 82 are preferably equal to the internal cross-sectional area of the main body of manifold 2.

Experiments were conducted comparing the performance of jacket member 1, product tube 3, and manifold 2 to the performance of product tube 3 having conventional coil cooling means, using identically sized condensers and compressors, and identically sized compositions under test. The experimental results are graphically represented in FIG. 7, which show the significant reduction in time necessary to cool water, to near freezing temperatures. The experiments revealed that jacket member 1 and manifold 2 provide over a 40% improvement in efficiency over conventional systems utilizing cooling coils (approximately 90% efficiency compared to only approximately 50% efficiency for conventional systems).

As a result of the increase in efficiency in cooling compositions within product tube 3 by the combination of jacket member 1, product tube 3 and manifold 2, condenser 8 and compressor 7 can each operate at reduced performance levels compared to condensers and compressors that are associated with identically sized product tubes in conventional coil-cooled machines, while still maintaining device cooling performance levels comparable therewith. Because compressors 7 and condensers 8 having lowered performance levels are physically smaller than other compressors and condensers having higher performance characteristics, one preferred embodiment of the invention comprises a substantially portable device for preparing and dispensing confections such as soft serve ice cream. Soft serve ice cream machines which are sized for tabletop or portable use are not known in the industry.

The present invention provides other advantages over conventional systems. For example, the present invention is less expensive to manufacture in part because components such as conventional reservoirs, accumulators, or expansion valves are not necessarily needed.

Figure 5:
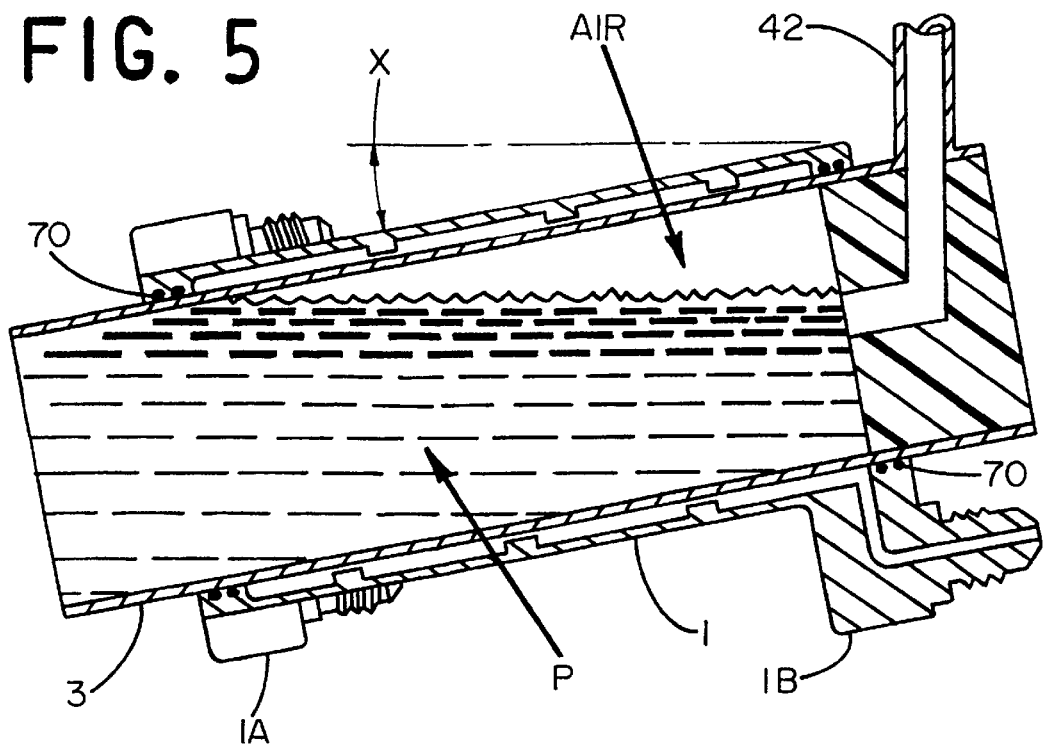
FIG. 5 is a cross sectional view the device of FIG. 4.
Figure 6:
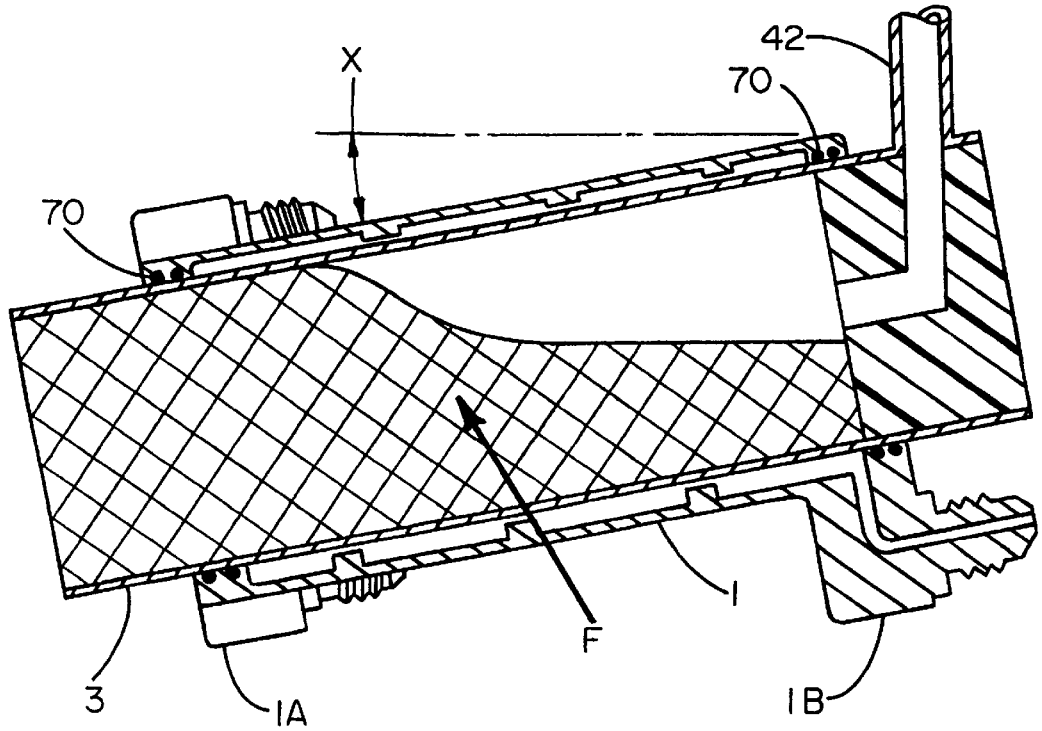
FIG. 6 is a cross sectional view of the device in FIG. 4.
Figure 7:
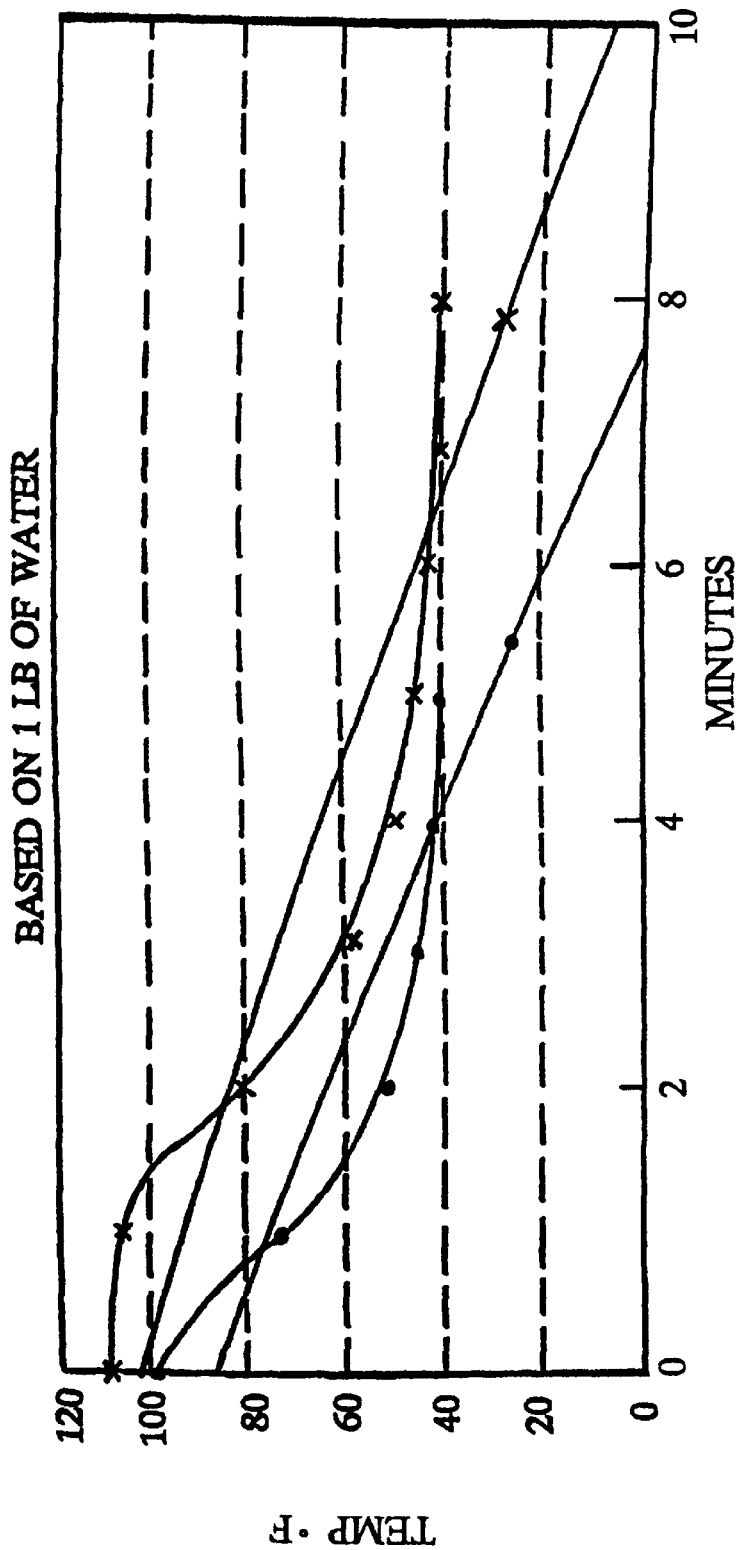
FIG. 7 is a graph illustrating the cooling efficiency of the present invention.
Figure 12:
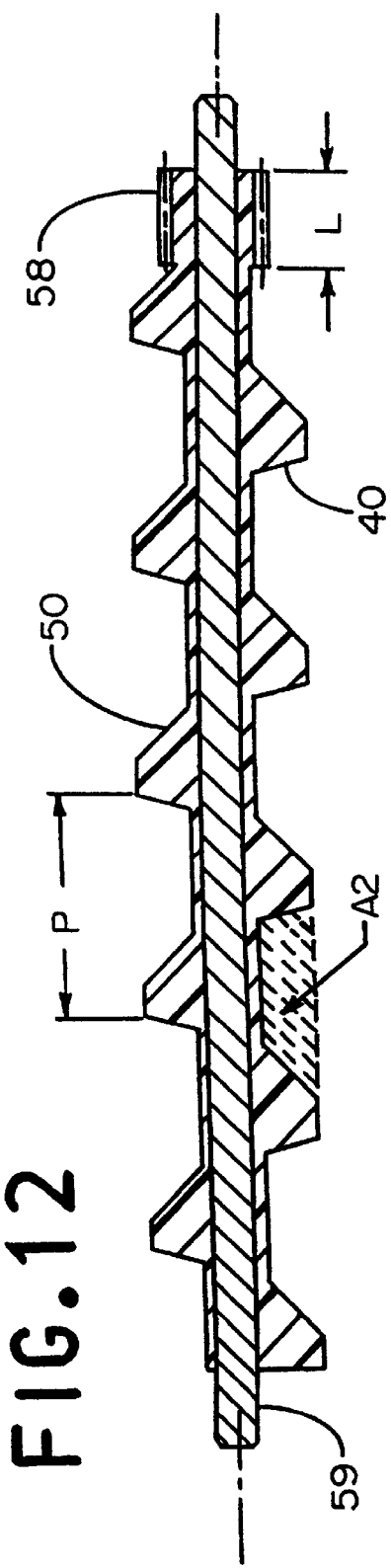
FIG. 12 is a cross sectional view of the auger member of FIG. 14 taken along the 12—12 line therein.

In a preferred embodiment of the present invention, product tube 3 and jacket member 1 are disposed so as to be angularly positioned relative to a horizontal axis. As shown in FIGS. 5 and 6, product tube 3 and jacket member 1 are positioned on an incline so that a product worked within product tube 3 is concentrated towards the dispensing end thereof. Such forward concentration of a product within product tube 3 accomplishes a number of objectives.

First, the angled position of product tube 3 allows the final product or cleaning products which are introduced to product tube 3 from product supply line 42 to easily and substantially completely drain from product tube 3 via the device dispensing nozzle located at the opposite end of product tube 3. Such products can be effectively drained even in the event of a loss in electricity.

Secondly, with the mixed product within product tube 3 flowing substantially forwardly towards the dispensing end thereof, unmixed products or ingredients can enter product tube 3 from product supply line 42 without having to substantially urge the mixed product forwardly by pressure.

Third, if a slight deviation in temperature exists along product tube 3, the surface area of product tube 3 having the coldest temperature (based upon the inlet ports 1A of jacket member 1 being located at the dispensing end of product tube 3, as shown in FIGS. 5 and 6) is substantially located at the forward or dispensing end thereof, substantially precisely where the product is concentrated when product tube 3 is positioned at an angle from the horizontal. FIG. 6 illustrates this by showing a measured area within product tube 3 (identified by the cross-hatched diagonal lines) being maintained at a substantially freezing temperature, while the area occupying the uppermost portion of product tube 3 nearest product tube supply line 42 being at a temperature slightly above the freezing temperature. By substantially concentrating products substantially within the area of product tube 3 having the coldest temperature, the device is most efficiently operated.

Tests have shown that by positioning product tube 3 at an angle approximately between 3° and 5° from the horizontal (FIG. 5), the concentration of a product therein is substantially concentrated in the area of product tube 3 having the coldest temperature, thereby providing substantially optimal cooling. As a result, product P is substantially disposed within the coldest area of product tube 3, thereby ensuring that product P is best maintained at the desired temperature.

The angled position of product tube 3 and jacket member 1 also allows for quick, thorough and efficient mixing of recently added ingredients with an already mixed product in product tube 3, in contrast to conventional devices in which the recently added ingredients at times fail to thoroughly mix with the already mixed product.

One preferred embodiment of the present invention preferably includes a means for thoroughly mixing and aerating a composition within product tube 3 so that the resulting product, such as a semi-frozen food confection, has a foam-like characteristic. The mixing means preferably comprises auger member 40 disposed substantially within product tube 3, and a means for providing substantially planetary motion to auger member 40 relative to a longitudinal axis of product tube 3. Planetary motion, in this context, refers to auger member 40 orbiting a longitudinal axis of product tube 3 while concurrently rotating about its own longitudinal axis. In the preferred embodiments of the present invention, auger member 40 orbits a longitudinal axis of product tube 3 in a first rotational direction while rotating about its own longitudinal axis in a second rotational direction that is opposite the first rotational direction.

Figure 11:
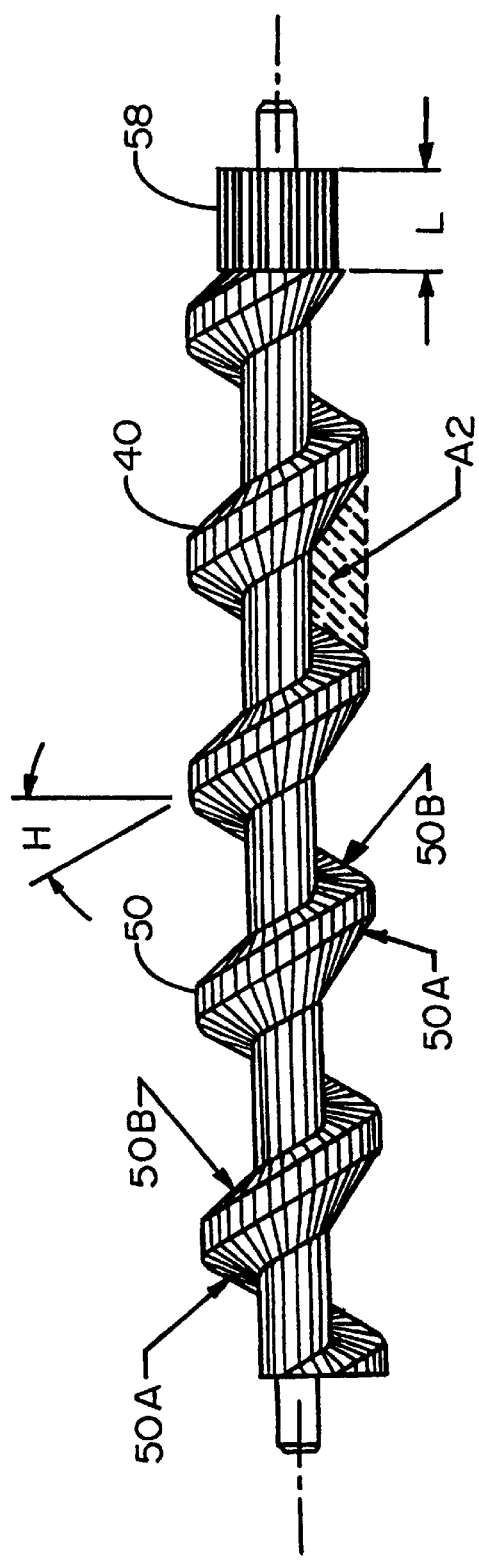
FIG. 11 is an elevational view of an auger member of the present invention.

Auger member 40 preferably includes a substantially helical auger blade 50 extending outwardly from auger shaft 59. Auger blade 50 includes a sloped leading edge 50A and an oppositely sloped trailing edge 50B, as shown in FIG. 11. When auger 40 is rotating about its longitudinal axis, the sloped or tapered edges of auger blade 50 substantially push the composition to be mixed substantially outwardly towards the wall of product tube 3 and forwardly towards the dispensing end thereof, thereby allowing the composition to cool and/or freeze more quickly as well as to substantially thoroughly mix and/or aerate the composition. The diameter of auger member 40 is such that as it rotates within product tube 3, it additionally mixes the composition located in the central portion thereof. The surfaces of auger blade 50 are preferably substantially smooth, thus allowing compositions to more easily slide therefrom when in operation. This method of processing results in a significant reduction in processing time.

The pitch P of auger blade 50 (FIG. 12), which determines helix angle H of auger blade 50 preferably varies depending upon the application of the device. Helix angle H determines the amount of thrust which urges the composition from the rearward (product input) end of product tube 3 to the forward (dispensing) end thereof. Pitch P of auger blade 50 also partially defines area A2 (FIG. 11) which is the area wherein a product and/or composition is worked (forwardly and outwardly directed forces acting thereon) by auger blade 50.

For example, for an auger member 40 being approximately 23 cm in length, there are approximately 5 pitches P resulting in a helix angle H of approximately 30°.

Figure 17:
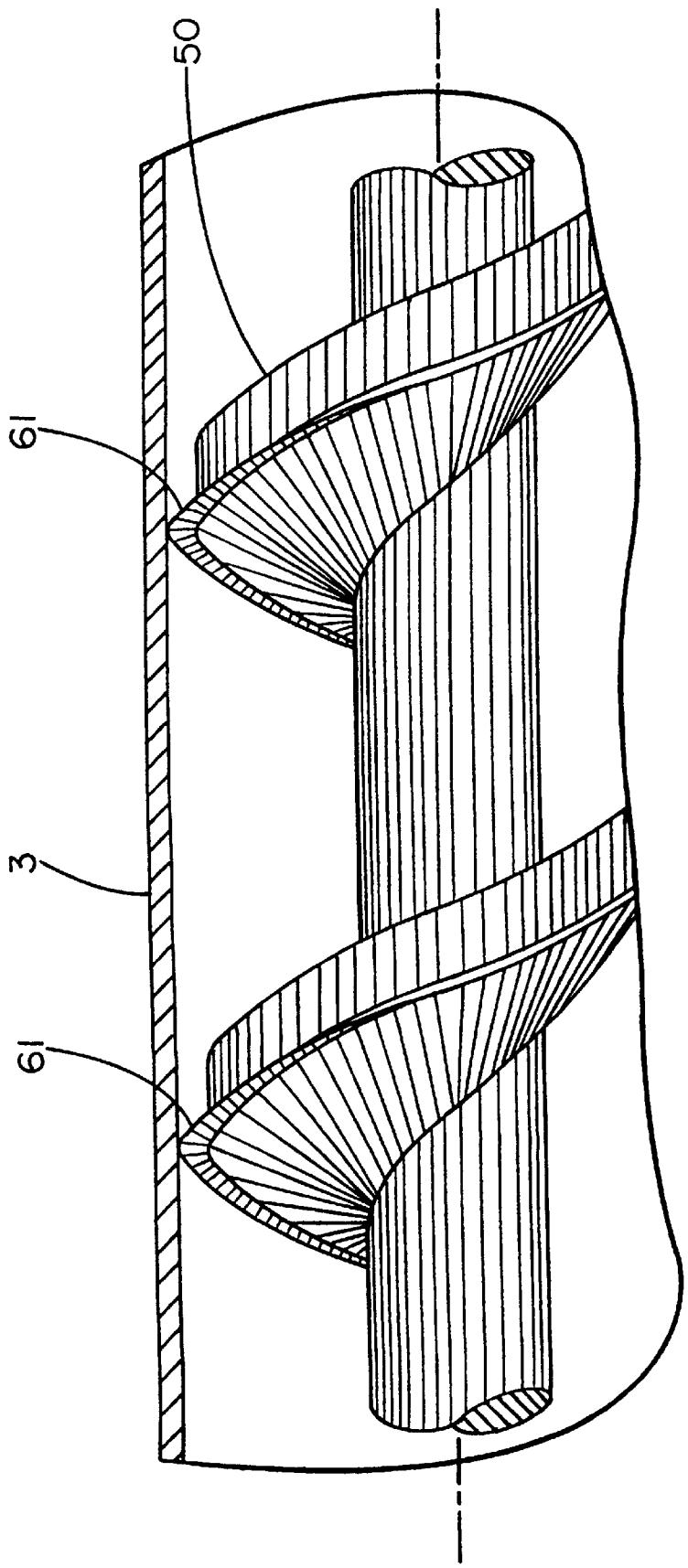
FIG. 17 is an elevational view of a portion of an auger member of the present invention.

In the preferred embodiments of the present invention, auger blade 50 substantially contacts the inner surface of product tube 3 so as to substantially scrape the product therefrom and to substantially urge it forwardly towards the dispensing end of product tube 3. In an alternative embodiment, auger blade 50 includes a substantially flexible scraper attachment 61 extending outwardly from the outer, forward end of auger blade 50, as shown in FIG. 17. The utilization of scraper attachment 61 substantially reduces manufacturing costs by substantially eliminating very tight tolerances of auger member 40 and product tube 3. As a result, auger member 40 may be constructed as a standard, replaceable part.

The preferred embodiments of the present invention preferably includes means for imparting substantially planetary motion to auger member 40 so as to thoroughly mix and/or aerate the product within product tube 3 by rotating auger member 40 about the central, longitudinal axis of product tube 3 in a first rotational direction as it concurrently rotates about its own longitudinal axis in a second direction of rotation that is opposite the first direction of rotation.

Auger member 40 and the planetary motion means provide significant improvements over conventional beating blades in conventional devices in that auger member 40 quickly mixes air with the substantially liquid product so as to produce a foam-like characteristic signifying the proper air-to-liquid ratio. Such foam-like characteristic is necessary before the liquid components substantially solidify. In a preferred embodiment, a composition having a 50% air-to-liquid ratio is achieved.

The planetary motion means comprises stationary internal gear 55, auger pinion gear 58, auger connecting shaft 54, and auger pivot shafts 56, 57.

Figure 15:
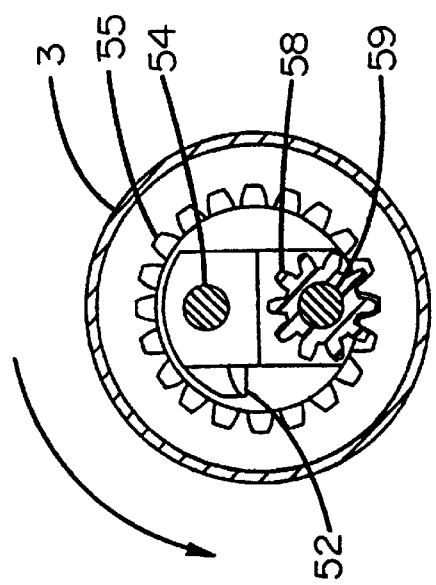
FIG. 15 is a cross sectional view of the auger member assembly of FIG. 16 taken along the 15—15 line therein.

Stationary internal gear 55 is substantially fixed substantially within one end portion of product tube 3 and includes a plurality of tooth spaces for receiving gearing teeth, as shown in FIG. 15. Auger pinion gear 58 is preferably attached to auger member 40 at one end thereof, so that when auger member 40 is disposed within product tube 3, the teeth of pinion gear 58 engages with the tooth spaces of stationary gear 55. In this way, as pinion gear 58 is rotated along the inner surface of stationary gear 55 in a substantially circular manner, auger member 40 is additionally rotated about its own longitudinal axis by the rotating motion of pinion gear 58 about its longitudinal axis, thus creating substantially planetary motion of auger member 40. As a result, auger member 40 rotates about stationary gear 55 in a first direction of rotation while it concurrently rotates about its own longitudinal axis in a second direction of rotation that is opposite the first direction of rotation. This reverse rotational characteristic of auger member 40 substantially rapidly creates a aerated composition having a substantially 50% air-to-liquid ratio.

The diameter of stationary gear 55 and the size of auger blade 50 are set so that auger member 40 substantially contacts substantially the entire inner surface of product tube 3. This assures that the product is substantially scraped from the surface of product tube 3 and is thus a significant improvement over conventional auger devices. The frequency with which auger blade 50 contacts the entire surface of product tube 3 depends in part upon the gearing ratio of stationary gear 55 to pinion gear 58. For example, if the gearing ratio of stationary gear 55 to pinion gear 58 is 2.5:1, then the entire surface of product tube 3 is scraped every 2.5 revolutions of auger member 40 about stationary gear 55. In the preferred embodiments of the invention, the surface of product tube 3 is substantially fully scraped between one and three revolutions of auger member 40. The gearing ratio between stationary gear 55 and pinion gear 58 also determines the center distance therebetween as well as the outside diameter of auger member 40.

Pinion gear 58 is preferably a spur gear so as to reduce manufacturing costs and to facilitate easy removal of auger member 40 from product tube 3, such as for cleaning or replacement purposes. Pinion gear 58 has only one tooth which engages with stationary gear 55 at a single time, and the edges of the teeth of pinion gear 58 and stationary gear 55 are substantially chamfered so as to allow pinion gear 58 to substantially slide into engagement with stationary gear 55. The lengths and tooth thicknesses of stationary gear 55 and pinion gear 58 are sized so as to add strength to the gearing and planetary motion means.

In alternative embodiments, the gearing comprises helical gearing or bevel gearing.

The planetary motion means of the preferred embodiments of the present invention further includes auger connecting shaft 54, which is disposed in a substantially parallel relationship to auger 40 within product tube 3, as shown in FIGS. 13–16. Auger connecting shaft 54 is indirectly connected to pinion gear 58 and thus rotates about product tube 3, and adds, among other things, stability to the rotating auger assembly.

Figure 13:
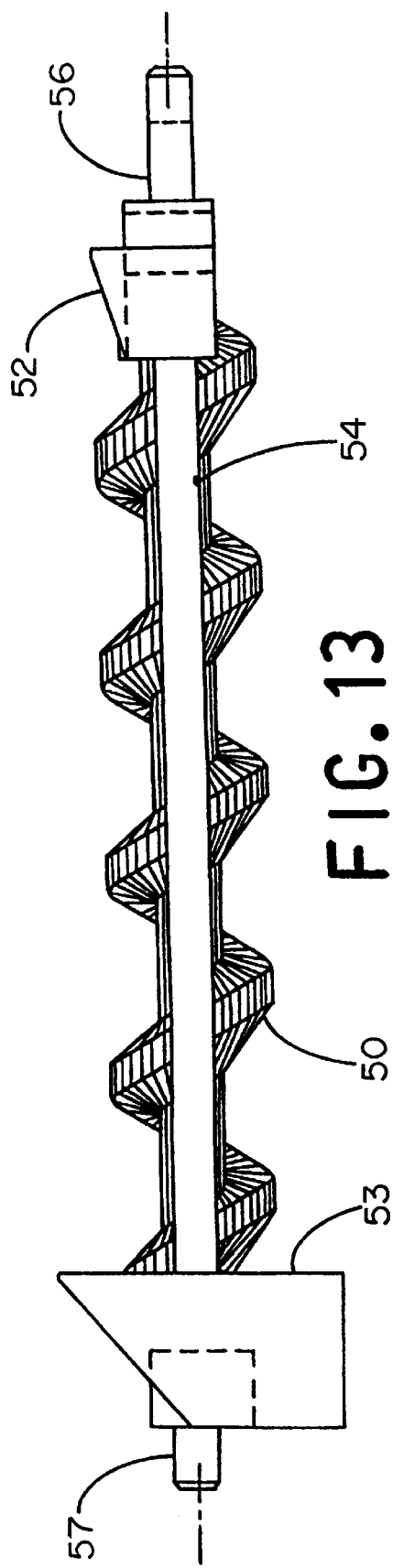
FIG. 13 is a cross sectional view of an auger member assembly of the present invention.
Figure 14:
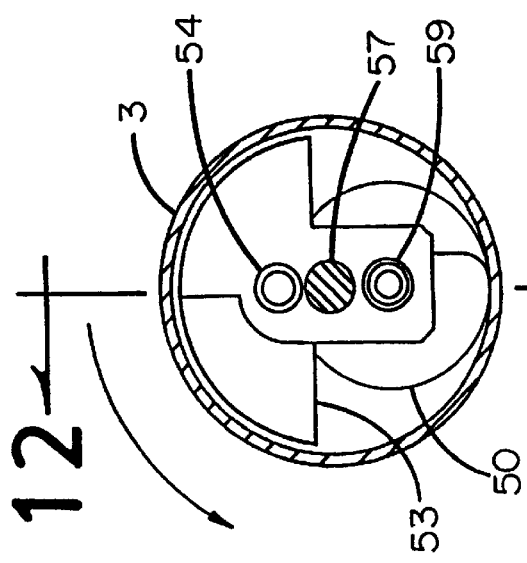
FIG. 14 is a cross sectional view of the auger member assembly of FIG. 16 taken along the 14—14 line therein.
Figure 16:
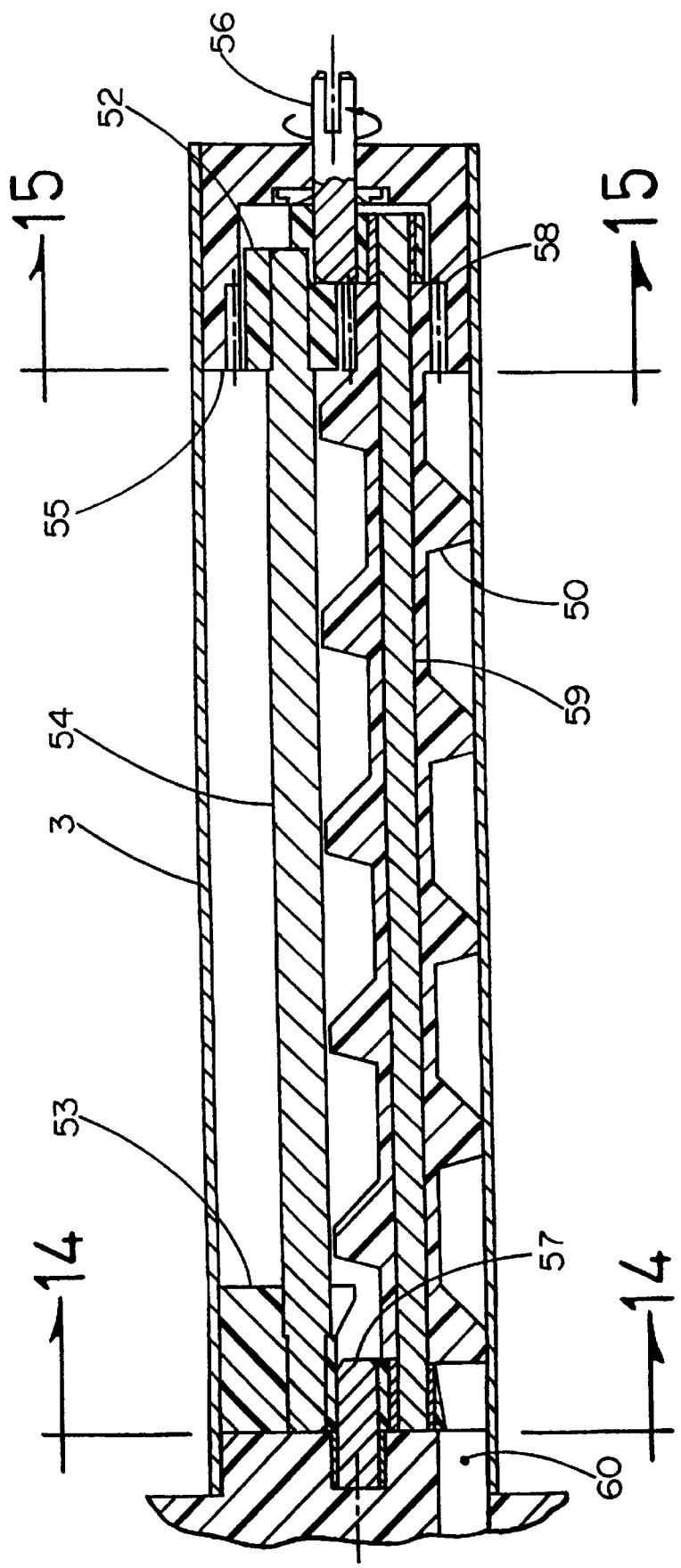
FIG. 16 is a cross sectional view of an auger member and product tube assembly.

Referring to FIGS. 13, 14, and 16, the planetary motion means includes auger assembly pivot shafts 56 and 57, which are each disposed substantially within product tube 3 so as to easily rotate about their respective longitudinal axes. Pivot shafts 56 and 57 are preferably connected to auger member 40 and connecting shaft 54 at opposite ends of each (FIG. 16). A motor (not shown) is preferably connected to the free end of pivot shaft 56 extending outwardly from product tube 3 so that as the motor causes pivot shaft 56 to rotate about its longitudinal axis, pinion gear 58 rotates within stationary gear 55, thereby rotating auger member 40 in a substantially planetary manner. Both pivot shafts 56 and 57 preferably but not necessarily connect to bearings so as to facilitate the rotational movement of each. In a preferred embodiment, auger member 40 rotates at approximately 2.5 times the rotational speed of pivot shafts 56 and 57 in order to adequately aerate the product so as to obtain a substantially foam-like consistency substantially therethrough.

According to the preferred embodiments of the present invention, the auger assembly further includes means for gathering the product composition which has been substantially urged to the forward (dispensing) end of product tube 3, and for forcing it out of the dispensing means. Referring to FIGS. 13 and 16, the product gathering means comprises front scoop 53 being attached to the end portion of rotating connecting shaft 54 at the forward end of product tube 3. Front scoop 53 preferably includes an angled inner edge so that as auger member 40 pushes the composition product to the forward end of product tube 3 in a first one half revolution, front scoop 53 directs the product towards product outlet port 60 and forces the product therethrough in the next one half revolution of auger member 40.

A preferred embodiment of the present invention further includes a means for efficiently directing the composition from the gearing assembly into the path of auger member 40. Such composition directing means preferably but not necessarily comprises back wedge 52, which is disposed about the rearward end of connecting shaft 54 and includes an edge or surface which removes the composition from the inner surface of stationary gear 55 as it is rotated therein. The contacting surface or edge is preferably angled (FIG. 13) so as to direct any accumulated product from stationary gear 55 into the mixing/aerating area of product tube 3.

In an alternative embodiment of the present invention, front scoop 53 and back wedge 52 may be configured to provide multiple pushing action per revolution of the auger assembly, in order to provide for more uniform product dispensing at reduced RPM's, thereby reducing noise, wear or other fatigue of the auger assembly.

In an alternative embodiment of the present invention, the motor which rotates auger member 40 and connecting shaft 54 about stationary gear 55 preferably cooperates with the dispensing device which discharges the mixed product from product tube 3 via product supply outlet port 60. The dispensing device preferably includes a lever which controls the position of a plunger relative to product supply outlet port 60, through manual activation thereof. As the lever is manually activated, the auger motor is automatically activated so as to push the mixed product forwardly through product supply outlet port 60 and the dispensing device. When the lever is deactivated, the motor is likewise deactivated.

The present invention preferably but not necessarily includes circuitry to activate the motor for auger member 40 prior to compressor 8 cooling product tube 3, and to deactivate the motor after compressor 8 is deactivated. Such control circuitry thereby ensures that the auger motor and compressor 8 are not activated and/or deactivated substantially simultaneously, so as to substantially avoid power surges or other hazards.

In use, refrigerant is supplied under pressure from compressor 7 and condenser 8 at a preselected temperature, passes through pressure control device 4 and control valve 5, and enters manifold 2. Manifold 2 substantially evenly distributes the refrigerant to jacket member 1 and into area A formed between jacket member 1 and product tube 3 so as to substantially uniformly maintain product tube 3 at the preselected temperature. The refrigerant then exits area A through outlet port 1B and returns to compressor 7.

The ingredients for the final product are introduced to product tube 3 via product supply inlet tube 42 and are quickly and thoroughly mixed and aerated together by auger member 40. By imparting substantially planetary motion to auger member 40 and by disposing product tube 3 at an angle offset from the horizontal, the product is mixed and cooled at the preselected temperature by urging the product to the inner surface of product tube 3, scraping it therefrom, and urging it towards the forward end of product tube 3. Front scoop 53 then directs the mixed, aerated composition to product supply outlet port 60 for dispensing. The dispensing of the mixed, final product is facilitated by product tube 3 being disposed at an angle from the horizontal.

The device is thoroughly cleaned by first introducing cleaning fluid into product tube 3 via product supply inlet port 42. Auger member 40 is then selectively activated so as to create sufficient splashing action of the cleaning fluid within product tube 3. Thereafter, the cleaning fluid is easily drained from product tube 3 through product supply outlet port 60 due to product tube 3 being positioned at an angle offset from the horizontal axis. Optionally, auger member 40 is selectively disconnected from product tube 3 for separate rinsing, washing, or replacing.

Although there have been described what are at present considered to be the preferred embodiments of the present invention, it will be understood that the invention can be embodied in other specific forms without departing from the spirit or essential characteristics thereof.

For example, the composition processing device may alternatively incorporate a plurality of product tubes 3 and corresponding jacket members 1. Such an embodiment preferably but not necessarily includes a separate motor for operating each auger member 40 so as to allow for separate operation of each product tube 3 and for reducing motor wear and extensive connecting devices from a motor to a plurality of pivot shafts 56.

The described embodiments are, therefore, to be considered in all aspects as illustrative, and not restrictive. The scope of the invention is indicated by the appended claims rather than the foregoing description.

We claim:

1. A device for processing compositions at selected temperatures, comprising:

means for receiving composition materials for processing, said receiving means being comprised of substantially thermally conductive material;

means, cooperating with said receiving means, for maintaining an outer surface of said receiving means at a substantially uniform temperature;

wherein said temperature maintaining means includes a jacket member disposed around said composition receiving means at a spaced distance therefrom so as to form an area therebetween, and a means for introducing fluid flow under pressure within said area so as to substantially directly contact said receiving means;

wherein said temperature maintaining means substantially maintains fluid of the fluid flow at a selected temperature;

said jacket member includes a plurality of inlet ports disposed at one end portion of said jacket member for receiving fluid flow within said area between said jacket member and said article receiving means, and at least one outlet port disposed at a second end portion of said jacket member for discharging the fluid from said jacket member; and said inlet ports are circumferentially disposed substantially evenly about said first end of said jacket member.

2. A device as recited in claim 1, wherein:

said temperature maintaining means includes a manifold in fluid communication with each of said inlet ports so as to provide fluid flow to said jacket member; and wherein said manifold is positioned proximally to said jacket member.

3. A device as recited in claim 1, wherein:

said composition receiving means is substantially elongated, having a longitudinal axis which is substantially horizontal;

said longitudinal axis of said composition receiving means is positioned at an angle approximately between 3–5 degrees from a horizontal axis;

said composition receiving means includes a first port located at a first end thereof for receiving composition ingredients, and a second port located at a second end thereof for discharging the processed composition; and said first end of said composition receiving means is positioned in an elevated position relative to said second end thereof.

4. A device as recited in claim 3, wherein:

said inlet ports of said jacket member are positioned substantially adjacent said second end of said composition receiving means, and said outlet ports of said jacket member is positioned substantially adjacent said first end of said composition receiving means.

5. A device as recited in claim 1, including:

means, connected to said composition receiving means, for selectively mixing compositions located therein, wherein said working means includes an auger member;

said auger member includes a leading edge and a trailing edge; and said leading edge and said trailing edge of said auger member are substantially outwardly sloped so as to substantially urge compositions from said first end of said composition receiving means to said second end thereof.

6. A device as recited in claim 5, wherein:

said mixing means includes means for rotating said auger member about a longitudinal axis of said composition receiving means in a first rotational direction while concurrently rotating said auger member about its longitudinal axis in a second rotational direction that is opposite said first direction.

7. A device as recited in claim 1, wherein:

said inlet ports of said jacket member direct fluid flow substantially tangentially along an outer surface of said receiving means.

8. A device as recited in claim 7, wherein:

said inlet ports of said jacket member are substantially longitudinally staggered along said jacket member.

9. A device for preparing and dispensing a food confection, comprising:

a container member for receiving confection ingredients, having a first port for receiving the ingredients and a second port for dispensing the prepared confection;

an auger member disposed within said container member and having an auger blade in a substantially helical relationship with a central portion of said auger member defining a longitudinal axis thereof; and means for rotating said auger member in a first rotational direction about its longitudinal axis while concurrently rotating said auger member in a second rotational direction about a longitudinal axis of said container member, wherein said second rotational direction is opposite said first rotational direction.

10. A device as recited in claim 9, wherein:

said blade of said auger member has a leading surface and a trailing surface; and said front surface and said back surface are substantially outwardly tapered relative to said longitudinal axis of said auger member.

11. A device as recited in claim 9, wherein:

said auger rotating means includes an internal gear disposed in a substantially fixed engagement relative to said container member and having a plurality of recesses along an inner surface thereof, and a pinion gear disposed about said central portion of said auger member at a first end portion thereof so as to movably engage with said recesses of said internal gear.

12. A device as recited in claim 9, including:

a jacket through which said container member is telescopically disposed at a spaced distance therefrom, said jacket and said container member forming a substantially closed area through which refrigerant material flows;

said jacket having at least one inlet port disposed along a first end thereof, for supplying refrigerant into said area, and at least one outlet port disposed along a second end thereof, for discharging refrigerant from said area;

a longitudinal axis of said jacket and said container member are disposed between approximately three and five degrees from a horizontal axis; and said inlet port of said jacket being positioned at an elevated position relative to said outlet port thereof.

13. A device as recited in claim 9, including:

an elongated shaft member disposed within said container member at a spaced distance from said auger member, said shaft member being rotated about a longitudinal axis of said container member as said auger member is rotated therearound; and a scoop member disposed along an end portion of said shaft member near said second port of said container member, said scoop member having an edge which pushes the confection to said second port of said container member.

14. A device as recited in claim 11, including:

an elongated shaft member disposed within said container member at a spaced distance from said auger member, said shaft member being rotated about a longitudinal axis of said container member as said auger member is rotated therearound; and a wedge member disposed along an end portion of said shaft member, said wedge member having an edge which directs the confection therefrom and towards a central portion of said container member.

* * * * *